United States Patent
Chang et al.

(10) Patent No.: US 10,081,716 B2
(45) Date of Patent: Sep. 25, 2018

(54) PROCESS FOR PREPARING THERMOPLASTIC ELASTOMER FOAM AND FOAMED ARTICLE

(71) Applicant: NIKE, Inc., Beaverton, OR (US)

(72) Inventors: Yihua Chang, Portland, OR (US); Richard L. Watkins, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 15/752,680

(22) PCT Filed: Aug. 9, 2016

(86) PCT No.: PCT/US2016/046156
§ 371 (c)(1),
(2) Date: Feb. 14, 2018

(87) PCT Pub. No.: WO2017/030835
PCT Pub. Date: Feb. 23, 2017

(65) Prior Publication Data
US 2018/0237605 A1    Aug. 23, 2018

Related U.S. Application Data

(60) Provisional application No. 62/206,906, filed on Aug. 19, 2015.

(51) Int. Cl.
| | |
|---|---|
| *C08J 9/00* | (2006.01) |
| *C08J 9/18* | (2006.01) |
| *C08J 9/22* | (2006.01) |
| *C08J 9/12* | (2006.01) |

(52) U.S. Cl.
CPC ........... *C08J 9/0061* (2013.01); *C08J 9/122* (2013.01); *C08J 9/18* (2013.01); *C08J 9/22* (2013.01); *C08J 2201/03* (2013.01); *C08J 2201/032* (2013.01); *C08J 2203/06* (2013.01); *C08J 2203/08* (2013.01); *C08J 2205/052* (2013.01); *C08J 2207/00* (2013.01); *C08J 2375/04* (2013.01); *C08J 2423/08* (2013.01);
(Continued)

(58) Field of Classification Search
CPC ........... C08J 9/0061; C08J 2477/00–2477/12
See application file for complete search history.

(56) References Cited

U.S. PATENT DOCUMENTS

| | | | |
|---|---|---|---|
| 4,303,756 A * | 12/1981 | Kajimura | ............ C08F 255/04 521/139 |
| 8,568,632 B2 | 10/2013 | Rynd et al. | |
| 2011/0275732 A1 | 11/2011 | Bruchmann et al. | |

(Continued)

OTHER PUBLICATIONS

Machine translation of JP 2011-057971 A by Hiranabe et al. (Year: 2011).*

(Continued)

*Primary Examiner* — Michael M Dollinger
*Assistant Examiner* — Christina H Wales
(74) *Attorney, Agent, or Firm* — Thomas | Horstemeyer, LLP

(57) ABSTRACT

A thermoplastic elastomer foam is made by incorporating a gaseous or supercritical blowing agent under pressure into a molten thermoplastic elastomer comprising polymeric polymeric crystalline domains, then releasing the pressure to foam the thermoplastic elastomer.

20 Claims, 1 Drawing Sheet

(52) U.S. Cl.
CPC ........ *C08J 2429/04* (2013.01); *C08J 2467/00* (2013.01); *C08J 2477/00* (2013.01)

(56) References Cited

U.S. PATENT DOCUMENTS

| | | |
|---|---|---|
| 2014/0259329 A1 | 9/2014 | Watkins et al. |
| 2014/0259753 A1 | 9/2014 | Watkins et al. |
| 2014/0272379 A1 | 9/2014 | Watkins et al. |
| 2014/0275306 A1 | 9/2014 | Watkins et al. |

OTHER PUBLICATIONS

Pieter Spitael, Christopher W. Macosko, and Richard B. McClurg. "Block Copolymer Micelles for Nucleation of Microcellular Thermoplastic Foams". Macromolecules 2004, 37, 6874-6882. (Year: 2004).*
Eval e171b technical data sheet (Year: 2016).*
Universal Selector PSJ-Polystyrene G9401 Technical Data Sheet (Year: 2017).*
International Preliminary Report on Patentability issued by the European Patent Office for PCT/US2016/046156, dated Jun. 17, 2017.
Written Opinion of the International Searching Authority issued by the European Patent Office for PCT/US2016/046156, dated Nov. 2, 2016.
Communication Pursuant to Article 94(3) issued by the European Patent Office for application 16762918.7, dated Apr. 19, 2018.
International Search Report for PCT/US2016/046156, dated Nov. 4, 2016.
Written Opinion of the International Preliminary Examining Authority for application, PCT/US2016/046156, dated Mar. 2, 2017.

\* cited by examiner

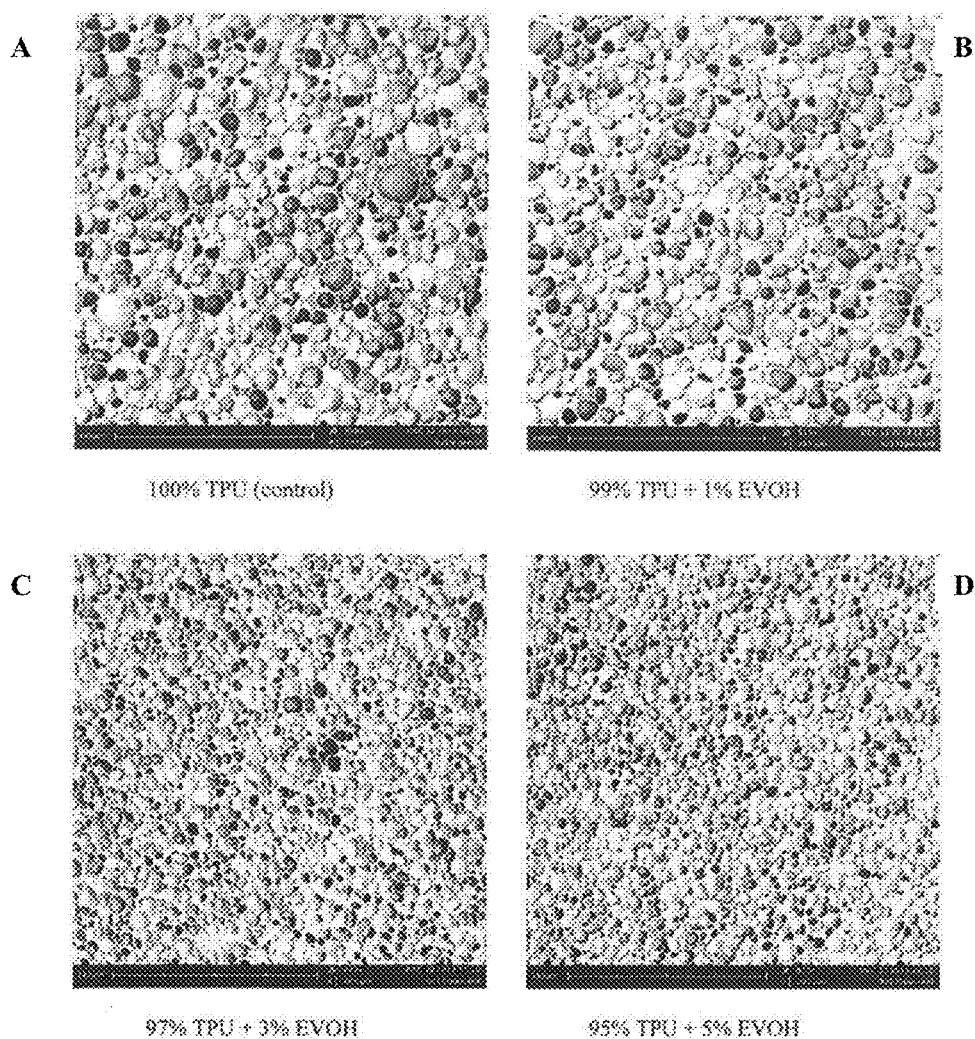

PROCESS FOR PREPARING THERMOPLASTIC ELASTOMER FOAM AND FOAMED ARTICLE

CROSS-REFERENCE TO RELATED APPLICATIONS

This application is a National Phase Application of International Application No. PCT/US2016/046156, filed Aug. 9, 2016, which claims the benefit of U.S. Provisional Application No. 62/206,906, filed on Aug. 19, 2015, which applications are incorporated herein fully by this reference.

FIELD AND BACKGROUND OF THE DISCLOSURE

The present disclosure relates to methods for making thermoplastic elastomer foams and foamed articles.

This section provides background information related to this disclosure but which may or may not be prior art.

Polyurethane foams are typically prepared by using chemically-acting blowing agents or physically-acting blowing agents that are mixed into or injected into the monomer reactants during polymerization. As an example, chemical blowing agents like water or formic acid form gaseous products by reaction with isocyanate groups, while physical blowing agents are dissolved or emulsified in the monomers and vaporize under polyurethane polymerization conditions. Other polymer foams may be made using azo compounds, hydrazine, or sodium bicarbonate. Examples of physical blowing agents include hydrocarbons, halogenated hydrocarbons, and carbon dioxide. Physical blowing agents are typically introduced either in-line, i.e. directly into the mixing head, or via a stock tank in a batch operation. Such a process is described, for instance, in Bruchmann et al., US Patent Application Publication No. US 2011/0275732.

Many physical properties of foams depend in large part on the cell morphology of the foam, including compressive strength, thermal conductivity, dimensional stability, and water absorption rate. However, it is difficult to control polymer foaming to the degree necessary for consistent production of a cell morphology that will produce a particular foam property, like good compressive strength, when making uncrosslinked (thermoplastic) foams. Prior art attempts to make foam micro-structures having desirable cell morphologies have included the use of powdered nucleation agents. Among these nucleating agents, inorganic oxides, such as talc, titanium dioxide, and kaolin have been used. Nucleation efficiency and, consequently, cell size and shape depend on the nucleating agent's particle size, shape, and surface treatment and distribution in the material being foamed. However, adding these nucleating agents can adversely affect other foam properties.

A need remains for improved methods of forming polyurethane foams, especially thermoplastic polyurethane foamed, that provide a cell structure for improved properties.

DRAWING

The drawings described herein is for illustrative purposes only of selected aspects and not all possible implementations, and is not intended to limit the scope of the present disclosure.

FIG. 1 shows scanning electron microscopy images B-D of disclosed thermoplastic elastomer foams compared to a scanning electron microscopy image A of prior art foam.

DESCRIPTION

Disclosed are methods of forming foams with a given average cell size by forming polymeric crystalline domains throughout a thermoplastic elastomer composition that provide nucleation sites. The thermoplastic elastomer composition having the polymeric crystalline domains is combined with a physical blowing agent under pressure. The pressure is released at a temperature below the crystallization temperature of the polymeric crystalline domains to foam the thermoplastic elastomer and form a thermoplastic elastomer foam. The polymeric crystalline domains serve as nucleation sites during foaming, and the amount of polymeric crystalline domains distributed in the thermoplastic elastomer is selected to provide a certain average cell size. The method and technology now being disclosed provide an effective way to prepare a foam with more uniformly sized and uniformly distributed foam cells and to reliably control cell size and distribution in a straightforward way without using fillers.

An aspect is a method of making a thermoplastic elastomer foam that includes incorporating a gaseous or supercritical blowing agent, for example gaseous or supercritical carbon dioxide or nitrogen, under pressure into a thermoplastic elastomer composition comprising polymeric crystalline domains, then releasing the pressure to foam the thermoplastic elastomer composition. The crystalline domains should be uniformly distributed through the thermoplastic elastomer composition, and the domains may generally be of uniform or approximately uniform size. The content of the polymeric crystalline domains and amount of blowing agent may produce an average cell size from 1 to 20 micrometers in the thermoplastic elastomer foam. For example, the polymeric crystalline domains may be provided by from 0.1 wt % to 20 wt %, based on total polymer weight, of a semi-crystalline polymer (or from 0.1 wt % or from 0.5 wt % or from 1 wt % up to 5 wt % or up to 10 wt % or up to 15 wt % or up to 20 wt %, based on total polymer weight, of the semi-crystalline polymer), wherein the semi-crystalline polymer is at a temperature below the crystallization temperature (Tc) at the time the pressure is released to foam the thermoplastic elastomer. The amount of semi-crystalline polymer incorporated into the thermoplastic elastomer composition, or the concentration and size of the polymeric crystalline regions provided by the semi-crystalline polymer mixed throughout the thermoplastic elastomer composition, may be selected based on an average cell size produced for the foam and the crystalline content of the semi-crystalline polymer. The polymeric crystalline domains of the semi-crystalline polymer act as nucleating agents. The semi-crystalline polymer may be selected from copolymers of ethylene with at least one vinyl co-monomer, polyamides, polyesters, and combinations of these, for example nylon 11, nylon 12, and ethylene-vinyl alcohol copolymers, and the thermoplastic elastomer may be a thermoplastic polyurethane elastomer. The thermoplastic polyurethane foam that is formed by the method may have a density of 160 kg/m³ to 300 kg/m³ and may be either a closed cell foam or an open cell foam. The foam may be molded during or after foaming or otherwise formed after foaming into an article, for example an article of clothing, footwear, protective equipment, a strap, or a component of one of these.

Also disclosed is a method of making a thermoplastic elastomer foam by providing a polymer mixture comprising a thermoplastic elastomer and from 0.1 wt % to 20 wt %, based on total polymer weight, of a semi-crystalline polymer; incorporating a gaseous or supercritical blowing agent into the mixture under pressure at a temperature at which the thermoplastic elastomer is molten and that is below the crystallization temperature of the semi-crystalline polymer; and releasing the pressure to foam the mixture thereby forming the thermoplastic elastomer foam. The polymer mixture may be formed by combining a molten thermoplastic elastomer and from 0.1 wt % to 20 wt %, based on total polymer weight, of a molten semi-crystalline polymer, for example in an extruder. The blowing agent is incorporated into the polymer mixture, then the polymer mixture may be foamed once the temperature is below the crystallization temperature of the semi-crystalline polymer and the pressure is released. Again, the semi-crystalline polymer may be selected from copolymers of ethylene with at least one vinyl monomer, polyamides, polyesters, and combinations of these, for example nylon 11, nylon 12, and ethylene-vinyl alcohol copolymers, and the thermoplastic elastomer may be a thermoplastic polyurethane elastomer. The thermoplastic polyurethane foam that is formed by the method may have a density of 160 kg/m$^3$ to 300 kg/m$^3$ and may be either a closed cell foam or an open cell foam. The foam may be molded during or after foaming or otherwise formed after foaming into an article, for example an article of clothing, footwear, protective equipment, a strap, or a component of one of these.

In another aspect, a method of preparing a thermoplastic elastomer foam includes forming a mixture comprising a molten thermoplastic elastomer and from 0.1 wt % to 20 wt % of a molten semi-crystalline polymer that is miscible in the thermoplastic elastomer to form a polymer melt. A gaseous or supercritical blowing agent is incorporated into the mixture under pressure. The mixture is cooled to a temperature below the crystallization temperature of the semi-crystalline polymer to cause crystalline regions of the semi-crystalline polymer to phase-separate from the mixture. The pressure is released when the mixture contains these crystalline regions, and the thermoplastic elastomer is foamed to form the thermoplastic elastomer foam with the crystalline regions providing nucleation sites.

In yet another aspect, a method of preparing a thermoplastic elastomer foam includes cooling a thermoplastic elastomer comprising from 0.1 wt % to 20 wt % of a semi-crystalline polymer to a temperature below the crystallization temperature of the semi-crystalline polymer, wherein crystalline regions of the semi-crystalline polymer phase separates from the thermoplastic elastomer. A gaseous or supercritical blowing agent is incorporated into the thermoplastic elastomer under pressure before, during, or after the crystalline regions phase separate. The pressure is released at a temperature at which the crystalline regions are present, and the thermoplastic elastomer is foamed to form the thermoplastic elastomer foam. The polymer mixture should be uniform so that the crystalline regions are uniformly distributed in the thermoplastic elastomer. The amount of crystalline regions and their concentration can be controlled by nature and amount of the semi-crystalline polymer or polymers used.

Numerous specific details are given here to provide a thorough understanding of the technology now being disclosed. The aspects can be practiced without one or more of the specific details or with other methods, components, materials, etc. In other instances, well-known structures, materials, or operations are not shown or described in detail to avoid obscuring aspects of the aspects. Reference throughout this specification to "one aspect," "an aspect," or "aspects" means that a particular feature, structure, or characteristic is included in at least one aspect. Thus, the appearances of the phrases "in one aspect" or "in an aspect" in various places throughout this specification are not necessarily all referring to the same aspect. Furthermore, the particular features, structures, or characteristics may be combined in other aspects.

As used in this description, "a," "an," "the," "at least one," and "one or more" indicate interchangeably that at least one of the item is present; a plurality of such items may be present unless the context unequivocally indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the technological field with this ordinary meaning, then "about" as used herein indicates at least variations that may arise from ordinary methods of measuring and using such parameters. In addition, disclosures of ranges are to be understood as specifically disclosing all values and further divided ranges within the range. The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

The thermoplastic elastomer foam may be a closed-cell foam or an open-cell foam. In some aspects, the thermoplastic elastomer foam is a closed-cell foam with at least 100%, at least 99%, at least 97%, at least 90%, at least 75%, at least 60%, or at least 50% closed cells.

Nonlimiting examples of suitable thermoplastic elastomers include thermoplastic polyurethane elastomers, thermoplastic polyurea elastomers, thermoplastic polyamide elastomers (in particular polyether block polyamides (PEBA)), thermoplastic polyester elastomers, metallocene-catalyzed block copolymers of ethylene and α-olefins having 4 to 8 carbon atoms, and styrene block copolymer elastomers such as poly(styrene-butadiene-styrene), poly(styrene-ethylene-co-butylene-styrene), and poly(styrene-isoprene-styrene).

Thermoplastic polyurethane elastomers may be selected from thermoplastic polyester-polyurethanes, polyether-polyurethanes, polycarbonate-polyurethanes, and polyurethanes made with polyolefinic segments. Suitable thermoplastic polyurethane elastomer include, without limitation, polyurethanes polymerized using as polymeric diol reactants polyethers, polyesters including polycaprolactone polyesters, polycarbonate diols, and hydrogenated polybutadiene diols. These polymeric diol-based polyurethanes are prepared by reaction of the polymeric diol (polyester diol, polyether diol, polycaprolactone diol, polytetrahydrofuran diol, polycarbonate diol, hydrogenated polybutadiene diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylenebis-4-cyclohexyl isocyanate ($H_{12}$MDI), cyclohexyl diisocyanate (CHDI), m-tetramethylxylene diisocyanate (m-TMXDI), p-tetramethylxylene diisocyanate (p-TMXDI), 4,4'-methylenediphenyl diisocyanate (MDI, also known as 4,4'-diphenylmethane diisocyanate), 2,4- and 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediiscyanate and para-xylylenediisocyanate (XDI), 4-chloro-1,3-phenylene diisocyanate, 1,5-tetrahydro-naphthalene diisocyanate, 4,4'-dibenzyl diisocyanate, and combinations of these. Nonlimiting examples of higher-functionality polyisocyanates that may be used in limited amounts to produce slightly branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from 60 to 400.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as $C_2$-$C_8$ monools or monoisocyanates such as butyl isocyanate. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed is selected so that the product is a thermoplastic elastomer.

The polyester diols used in forming a thermoplastic polyurethane elastomer are in general prepared by the condensation polymerization of one or more polyacid compounds and one or more polyol compounds. Preferably, the polyacid compounds and polyol compounds are difunctional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred aspects, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred aspect, the lactone is c-caprolactone. Useful catalysts include those mentioned above for polyester synthesis. Alternatively, the reaction can be initiated by forming a sodium salt of the hydroxyl group on the molecules that will react with the lactone ring.

In other aspects, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various aspects, the polymeric diol may have a weight average molecular weight of at least 500, at least 1000, or at least 1800 and a weight average molecular weight of up to 10,000, but polymeric diols having weight average molecular weights of up to 5000, or up to 4000, may also be suitable. The polymeric diol may have a weight average molecular weight in the range from 500 to 10,000, from 1000 to 5000, or from 1500 to 4000. The weight average molecular weights may be determined by ASTM D-4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range in making the polyurethane elastomer. For example, the equivalent proportion of polyester diol to extender may be within the range of from 1:0 to 1:12 or from 1:1 to 1:8. In some aspects, the diisocyanate(s) employed are proportioned such that the overall ratio of equivalents of isocyanate to equivalents of active hydrogen containing materials is within the range of from 1:1 to 1:1.05 or from 1:1 to 1:1.02. The polymeric diol segments typically are from 35% to 65% by weight of the polyurethane polymer or from 35% to 50% by weight of the polyurethane polymer.

The selection of diisocyanate, extenders, polymeric diols, and the weight percent of the polymeric diols can be varied to produce a certain density and stability of the finished foam. In general, a greater content of a polymeric polyol that has a Hildenbrand solubility parameter closer to that of the supercritical fluid will permit higher absorption of the supercritical fluid that results in a lower density foam. In addition, in general, shorter polymeric diols provide foams that shrink less after they are first foamed. Use of higher number average molecular weight polymeric diols allows a higher degree of swelling, but a molecular weight that is too high may yield a less stable foam.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-di-amino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to limit crosslinking.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from 180° C. to 300° C. Specific examples of suitable polyamide blocks include, but are not limited to, NYLON 6, NYLON 66, NYLON 610, NYLON 11, NYLON 12, copolymerized NYLON, NYLON MXD6, and NYLON 46.

The effects of the type and molecular weights of the soft segment polymeric polyols used in making thermoplastic polyurea elastomers and polyamide elastomers are analogous to the same effects in making thermoplastic polyurethane elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the trade name HYTREL® from DuPont™.

Metallocene-catalyzed block copolymers of ethylene and α-olefins having from 4 to 8 carbon atoms may be prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. These materials are commercially available from ExxonMobil Chemical under the trade name EXACT' and from the Dow Chemical Company under the trade name ENGAGE™.

Styrene block copolymer elastomers such as poly(styrene-butadiene-styrene), poly(styrene-ethylene-co-butylene-styrene), and poly(styrene-isoprene-styrene) may be prepared by anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

Examples of suitable semi-crystalline polymers include, but are not limited to, copolymers of ethylene with at least one vinyl monomer including ethylene-vinyl acetate copolymers (EVA), ethylene-vinyl alcohol copolymers (EVOH), ethylene-vinyl chloride copolymer, ethylene-methyl methacrylate copolymer semi-crystalline polyamides; semi-crystalline polyesters; and combinations thereof. To be used in combination, semi-crystalline polymers have a crystallization temperature below the processing temperature of the thermoplastic elastomer. In some aspects, the semi-crystalline polymer comprises a member selected from the group consisting of nylon 11, nylon 12, polycaprolactone, ethylene-vinyl alcohol copolymer, and polylactide.

The molten semi-crystalline polymer is preferably uniformly distributed in the molten thermoplastic elastomer. In some aspects, the mixture comprises from 0.1 wt % to 20 wt %, from 0.1 wt % to 15 wt %, from 0.1 wt % to 12 wt %, from 0.1 wt % to 10 wt %, from 0.1 wt % to 8 wt %, from 0.1 wt % to 5 wt %, from 0.1 wt % to 4 wt %, from 0.1 wt % to 3 wt %, from 0.1 wt % to 2 wt %, from 0.1 wt % to 1 wt %, from 0.2 wt % to 20 wt %, from 0.2 wt % to 15 wt %, from 0.2 wt % to 12 wt %, from 0.2 wt % to 10 wt %, from 0.2 wt % to 8 wt %, from 0.2 wt % to 5 wt %, from 0.2 wt % to 4 wt %, from 0.2 wt % to 3 wt %, from 0.2 wt % to 2 wt %, from 0.2 wt % to 1 wt %, from 0.3 wt % to 20 wt %, from 0.3 wt % to 15 wt %, from 0.3 wt % to 12 wt %, from 0.3 wt % to 10 wt %, from 0.3 wt % to 8 wt %, from 0.3 wt % to 5 wt %, from 0.3 wt % to 4 wt %, from 0.3 wt % to 3 wt %, from 0.3 wt % to 2 wt %, from 0.3 wt % to 1 wt %, from 0.4 wt % to 20 wt %, from 0.4 wt % to 15 wt %, from 0.4 wt % to 12 wt %, from 0.4 wt % to 10 wt %, from 0.4 wt % to 8 wt %, from 0.4 wt % to 5 wt %, from 0.4 wt % to 4 wt %, from 0.4 wt % to 3 wt %, from 0.4 wt % to 2 wt %, from 0.4 wt % to 1 wt %, from 0.5 wt % to 20 wt %, from 0.5 wt % to 15 wt %, from 0.5 wt % to 12 wt %, from 0.5 wt % to 10 wt %, from 0.5 wt % to 8 wt %, from 0.5 wt % to 5 wt %, from 0.5 wt % to 4 wt %, from 0.5 wt % to 3 wt %, from 0.5 wt % to 2 wt %, from 0.5 wt % to 1 wt %, from 1 to 10 wt %, from 1 wt % to 5 wt %, from 2 wt % to 5 wt %, or from 3 wt % to 5 wt % of the semi-crystalline polymer. In some aspects, the mixture comprises from 0.1 wt % or from 0.2 wt % or from 0.3 wt % or from 0.4 wt % or from 0.5 wt % or from 0.6 wt % or from 0.7 wt % or from 0.8 wt % or from 0.9 wt % or from 1 wt % to 2 wt % or to 3 wt % or to 4 wt % or to 5 wt % or to 6 wt % or to 10 wt % or to 12 wt % or to 14 wt % or to 15 wt % or to 20 wt % of the semi-crystalline polymer. In some aspects, the mixture comprises less than 20 wt %, less than 10 wt %, less than 8 wt % less than 5 wt %, less than 4 wt %, less than 3 wt %, less than 2 wt %, or less than 1 wt % of the semi-crystalline polymer and preferably more than 0.1 wt %, more than 0.2 wt %, more than 0.3 wt %, more than 0.4 wt %, more than 0.5 wt %, more than 0.6 wt %, more than 0.7 wt %, more than 0.8 wt %, more than 0.9 wt %, or more than 1 wt % of the semi-crystalline polymer.

In some aspects, the mixture that is foamed comprises a thermoplastic polyurethane elastomer and a semi-crystalline polymer component comprising ethylene vinyl alcohol copolymer. In some aspects, the semi-crystalline polymer is an ethylene vinyl alcohol copolymer. In some aspects, the ethylene vinyl alcohol copolymer comprises a ratio of ethylene monomer units to vinyl alcohol monomer units. In some aspects, the ratio of ethylene monomer units to vinyl alcohol monomer units in the ethylene vinyl alcohol copolymer is from 20 mol % to 45 mol %, from 25 mol % to 40 mol %, from 30 mol % to 40 mol %, from 30 mol % to 35 mol %, or from 20 mol % to 30 mol %. In some aspects, the ratio of ethylene monomer units to vinyl alcohol monomer units in the ethylene vinyl alcohol copolymer is from 20 mol % or from 25 mol % to 30 mol % or to 40 mol %. In some aspects, the ratio of ethylene monomer units to vinyl alcohol monomer units in the ethylene vinyl alcohol copolymer is from 25 mol % or from 30 mol % to 35 mol % or to 40 mol %.

In some aspects, the thermoplastic elastomer foam comprises a thermoplastic polyurethane elastomer and ethylene vinyl alcohol copolymer, and the ratio of ethylene monomer units to vinyl alcohol monomer units in the ethylene vinyl alcohol copolymer is from 20 mol % or from 25 mol % or from 30 mol % to 35 mol % or to 40 mol % or to 45 mol %, and the ethylene vinyl alcohol copolymer is present in the foam in an amount of from 0.5 wt % or from 1 wt % or from 2 wt % or from 5 wt % or from 10 wt % to 12 wt % or to 15 wt % or to 18 wt % or to 20 wt % of the foam.

In some aspects, the thermoplastic elastomer foam comprises a thermoplastic polyurethane elastomer and ethylene vinyl alcohol copolymer, and the ethylene vinyl alcohol copolymer is present in the thermoplastic elastomer foam in an amount of from 0.5 wt % or from 1 wt % or from 2 wt % or from 5 wt % or from 10 wt % to 12 wt % or to 15 wt % or to 18 wt % or to 20 wt % of the thermoplastic elastomer foam. In some aspects, the ethylene vinyl alcohol copolymer is present in the thermoplastic elastomer foam in an amount of from 0.5 wt % to 20 wt %, from 1 wt % to 15 wt %, from 1 wt % to 10 wt %, from 2 wt % to 10 wt %, from 5% to 10 wt %, from 1 wt % A to 5 wt %, from 10 wt % to 15 wt %, from 15 wt % to 20 wt %, less than 20 wt %, less than 15 wt %, less than 10 wt %, or less than 5 wt % of the thermoplastic elastomer foam.

The gaseous or supercritical blowing agent should be inert to the elastomeric polymer mixture. The gaseous or supercritical blowing agent is incorporated into the thermoplastic elastomer mixture under pressure, then the pressure is released to foam the polymer mixture.

The inert gas or supercritical fluid is not particularly limited as long as it is inert to the both the thermoplastic elastomer and the semi-crystalline polymer contained in the thermoplastic elastomer foam and the thermoplastic elastomer it can be incorporated into the thermoplastic elastomer-semi-crystalline polymer mixture. Examples of suitable such blowing agents include carbon dioxide, nitrogen gas, and air. Note that the inert gas may be a mixed gas comprising two or more gases. In some aspects, the blowing agent is carbon dioxide or nitrogen in gaseous or supercritical state. When the thermoplastic elastomer is thermoplastic polyurethane elastomer, gaseous or supercritical carbon dioxide or a combination of gaseous or supercritical carbon dioxide with gaseous or supercritical nitrogen may be used to take advantage of the greater solubility of the carbon dioxide in solid thermoplastic polyurethane elastomer when the impregnation is done below the glass transition temperature of the thermoplastic polyurethane elastomer.

The rate of incorporation of the blowing agent into the thermoplastic elastomer mixture comprising a semi-crystalline polymer may be increased by using the blowing agent in supercritical state. Supercritical fluids may have increased solubility in the thermoplastic elastomer mixture and thus may be used in a higher concentration. At a high concentration, the supercritical blowing agent generates a larger number of cell nuclei upon an abrupt pressure drop in foaming the thermoplastic elastomer, thus working with the crystalline regions in increasing the cell density.

Nonlimiting examples of suitable compounds that can be used as the supercritical fluid include carbon dioxide (critical temperature 31.1° C., critical pressure 7.38 MPa), nitrous oxide (critical temperature 36.5° C., critical pressure 7.24 MPa), ethane (critical temperature 32.3° C., critical pressure 4.88 MPa), ethylene (critical temperature 9.3° C., critical pressure 5.12 MPa), nitrogen (critical temperature −147° C., critical pressure 3.39 MPa), and oxygen (critical temperature −118.6° C., critical pressure 5.08 MPa).

Supercritical carbon dioxide fluid can be made more compatible with the polar thermoplastic elastomers (particularly thermoplastic polyurethane, polyurea, and polyamide elastomers) by combining the supercritical carbon dioxide with a polar fluid such as methanol, ethanol, propanol, or isopropanol. The polar fluid that is used can have a Hildebrand solubility parameter equal to or greater than 9 (cal/cm$^3$)$^{1/2}$. Increasing the weight fraction of the polar fluid increases the amount of supercritical carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain aspects, from 0.1 mole % to 7 mole % of the polar fluid is included in the supercritical fluid, based on total fluid, especially when used to infuse a polyurethane elastomer, polyurea elastomer, or a polyamide elastomer. In other aspects, from 0.5 mole % to 6 mole % or from 1 mole % to 5 mole % of the polar fluid is included in the supercritical fluid, based on total fluid.

Supercritical fluids may be used in combination. In some cases, supercritical nitrogen may be used as an auxiliary nucleating agent in a small weight percentage along with supercritical carbon dioxide or another supercritical fluid that acts as the blowing agent.

The articles are placed in a vessel that can withstand high pressure. The vessel is closed and CO$_2$ or other type of foaming agent is introduced. The vessel temperature and pressure are maintained above the critical temperature and pressure of the foaming agent. Once the article is saturated with the foaming agent, the vessel is rapidly depressurized. The article is then removed from the vessel as a foamed part, or heated to produce the foamed part. When a co-solvent is used, it can be introduced along with the CO$_2$ or added to the vessel with the article before the vessel is closed.

The thermoplastic article is soaked in the supercritical fluid under conditions (temperature and pressure) and for a time to allow it to take up a given amount of the supercritical fluid.

The process of foaming the thermoplastic elastomer comprising the semi-crystalline polymer using a high-pressure gas or supercritical fluid as a foaming agent may be a batch process or a continuous process. In the batch process, the thermoplastic elastomer/semi-crystalline polymer composition is formed into an article suitable for foaming, then the article is impregnated with a high-pressure gas or supercritical fluid, and then the pressure is released to allow the gas- or supercritical fluid-impregnated article to expand to a foam. In the continuous system, the thermoplastic elastomer/semi-crystalline polymer composition is kneaded under a pressure together with a high-pressure gas or supercritical fluid, then the kneaded mixture is molded into a molded article, and, simultaneously, the pressure is released to allow the gas- or supercritical fluid-impregnated molded article to expand to a foam.

In a batch process, the unfoamed thermoplastic elastomer may be formed into an article by a variety of methods. For example, the thermoplastic elastomer comprising a semi-crystalline polymer can be kneaded and extruded with an extruder such as a single-screw extruder or twin-screw extruder into an article or articles that may be further cut or shaped; or the thermoplastic elastomer comprising a semi-crystalline polymer can be uniformly kneaded beforehand with a kneading machine equipped with one or more blades typically of a roller, cam, kneader, or Banbury type, and then the resulting mixture can be press-molded typically with a hot-plate press to produce a molded sheet article having a predetermined thickness that may be further cut or shaped; or still further the thermoplastic elastomer comprising a semi-crystalline polymer can be molded with an injection molding machine to produce an article of a given shape. The unfoamed article of thermoplastic elastomer comprising a semi-crystalline polymer may have at least one thin dimension (e.g., a thickness or width of 10 mm or less, preferably 5 mm or less). The unfoamed article may be formed using other known methods to produce a given shape, including pellets (as already described above), sheets, strands, ropes, tubes, and other shapes, particularly shapes that include a dimension that is less than 10 mm, for example a dimension in a range of from 0.1 mm or from 0.5 mm up to 5 mm or up to 10 mm. The article that is foamed may have a regular or irregular shape and may be, for example, a pellet, bead, particle, cylinder, prolate obloid, cube, sphere, pyramid, tape, ribbon, rope, film, strand, or fiber. Pellets, beads, or particles may be generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on.

When the thermoplastic elastomer comprising the semi-crystalline polymer is subjected to foam molding by the above batch system, cells are formed in the thermoplastic elastomer comprising a semi-crystalline polymer through a gas or supercritical fluid impregnation step of putting the unfoamed thermoplastic elastomer comprising a semi-crystalline polymer molded article obtained as described above in a pressure-tight vessel (high pressure vessel) and injecting or otherwise introducing a high-pressure gas or supercritical fluid (for example nitrogen or carbon dioxide) to impregnate the unfoamed thermoplastic elastomer molded article with the high-pressure gas or supercritical fluid; a decompression step of releasing the pressure, typically, but not necessarily, to atmospheric pressure, when the unfoamed thermoplastic elastomer comprising a semi-crystalline polymer molded article is sufficiently impregnated with the high-pressure gas or supercritical fluid to form cell nuclei in the thermoplastic elastomer comprising in the semi-crystalline regions; and, optionally, a heating step of heating the thermoplastic elastomer article to allow the cell nuclei to grow. The cell nuclei may be allowed to grow at room temperature without providing the heating step. The semi-crystalline phase regions distributed throughout the thermoplastic elastomer serve as nucleation sites. The even distribution and selected concentration of these sites produce a foam with evenly-distributed, uniform foam cells of a certain size and in a certain concentration. The introduction of the high-pressure gas may be performed continuously or discontinuously. Heating to expand the cell nuclei can be carried out, for example, in a heated oil bath, with a hot roll, in a hot-air oven, or with infrared or microwave radiation. Water is one suitable medium in which foaming readily occurs at an appropriate temperature because water has a high heat capacity and heat transfer rate. In certain preferred aspects, the thermoplastic elastomer article infused or saturated with supercritical fluid is submerged in water that is at a temperature at least 80° higher and, preferably, at least 100° higher than the elastomer's (soft segment) $T_g$ but less than the elastomer's (hard segment) $T_m$. Other examples of suitable mediums are steam or pressurized hot air.

In one example, the thermoplastic article is soaked under conditions that result in it becoming saturated with the supercritical fluid. The article is then removed from the chamber and immediately either heated to a temperature in a medium with suitable thermal characteristics for foaming to occur or is exposed to microwaves or infrared radiation in a tunnel or oven to cause the foaming to occur. In microwave heating, the material is exposed to an electromagnetic wave that causes the molecules in the material to oscillate, thereby generating heat. In a batch process, the articles saturated with the supercritical fluid are placed in a microwave oven or a device equipped with an IR lamp or IR lamps. Preferably the articles are rotated or agitated, when their size is small enough, to ensure fast and uniform heating. When foaming is completed, the articles are removed from the system. The heating can also be done in the continuous process. The articles are placed on a planar surface such as a belt that moves them through a tunnel or through a pipe. The system is designed so that the heating elements (IR lamp or microwave generator) can apply power to achieve rapid uniform heating. The time of heating is controlled by the speed by which the articles move through the tunnel or pipe.

When the thermoplastic elastomer comprising a semi-crystalline polymer is molded and foamed in a continuous process, the process may include kneading the thermoplastic elastomer comprising the semi-crystalline polymer in an extruder such as a single-screw extruder or twin-screw extruder and, while kneading the thermoplastic elastomer polymer, injecting or otherwise introducing into the polymer the high-pressure gas or supercritical fluid to impregnate the thermoplastic elastomer comprising a semi-crystalline polymer with the high-pressure gas or supercritical fluid; and then extruding the impregnated thermoplastic elastomer comprising a semi-crystalline polymer through a die arranged at a distal end of the extruder to release the pressure, typically but not necessarily to atmospheric pressure, to mold and foam the extruded article simultaneously. Like in the batch process, an optional heating step may be carried out to promote cell growth. The extruder may be coupled with an injection molding machine or the like to further shape the extrudate.

The amount of the gas or supercritical fluid introduced into the unfoamed thermoplastic elastomer comprising a semi-crystalline polymer is selected to provide a degree of foaming in the final article and may be, for example, from 2% or from 2.5% or from 3% up to 6% or up to 8% or up to 20% by weight, based on the total polymer weight. For example, the amount of the gas or supercritical fluid used may be from 2% up to 10% by weight or from 2% up to 8% by weight or from 2% up to 6% by weight or from 2.5% up to 10% by weight or from 2.5% up to 8% by weight or from 2.5% up to 6% by weight or from 3% up to 10% by weight or from 3% up to 8% by weight or from 3% up to 6% by weight, based on the total polymer weight.

The pressure at which the unfoamed thermoplastic elastomer comprising a semi-crystalline polymer is impregnated with a gas or supercritical fluid is suitably selected according to the type of gas or supercritical fluid, the viscosity of the polymer composition at the impregnation temperature, and the equipment being used. For example, the pressure may be from 6 MPa or from 8 MPa or from 15 MPa or from 25 MPa to 50 MPa or to 75 MPa or to 100 MPa. Examples pressure ranges include from 6 MPa to 100 MPa, from 6 MPa to 75 MPa, from 6 MPa to 50 MPa, from 8 MPa to 100 MPa, from 8 MPa to 75 MPa, from 8 MPa to 50 MPa, from 15 MPa to 100 MPa, from 15 MPa to 75 MPa, from 15 MPa to 50 MPa, from 25 MPa to 100 MN, from 25 MPa to 75 MPa, and from 25 MPa to 50 MPa If the pressure of the gas is lower than 6 MPa, considerable cell growth may occur during foaming. As a result, the number of cell nuclei formed may be smaller. Because of this, the gas amount per cell increases rather than decreases, resulting in excessively large cell diameters. Furthermore, in a region of pressures lower than 6 MPa, only a slight change in impregnation pressure results in considerable changes in cell diameter and cell density, and this may often impede the control of cell diameter and cell density.

The temperature at which the unfoamed thermoplastic elastomer comprising a semi-crystalline polymer is impregnated with a gas or supercritical fluid also may be suitably selected according to the type of gas or supercritical fluid, the particular polymer composition, and the equipment being used. For example, the impregnation temperature may be from 10° C. or from 40° C. or from 60° C. or from 100° C. or from 150° C. to 230° C. or to 240° C. or to 250° C. For impregnation with a supercritical fluid, the temperature and pressure are selected to maintain the fluid in its supercritical state.

Further, the decompression rate in the decompressing step (i.e., releasing the pressure) in the foam molding of the thermoplastic elastomer comprising a semi-crystalline polymer by the batch system or continuous system may be from 5 to 300 MPa/s to obtain uniform foam cells. Furthermore, the heating temperature for promoting cell growth during the foaming step may be, for example, from 40° C. to 250° C.

In some aspects, the foam of the thermoplastic elastomer comprising a semi-crystalline polymer has an average cell size of up to 20 microns. In some aspects, the thermoplastic elastomer foam has an average cell size of up to 15 microns, or up to 10 micron, or up to 7.5 microns, or up to 5 microns, or up to 2.5 microns. In some aspects, the thermoplastic elastomer foam has an average cell size of from 0.5 microns to 30 microns, or from 0.5 to 20 microns, or from 1 micron to 20 microns, or from 5 microns to 20 microns, or from 0.5 microns to 15 microns, or from 1 micron to 15 microns, or from 1 micron to 10 microns.

In some aspects, the thermoplastic elastomer foam has a foam density of from 160 kg/m$^3$ to 300 kg/m$^3$. For example, the thermoplastic elastomer foam density may be from 50 kg/m$^3$ to 500 kg/m$^3$, from 75 kg/m$^3$ to 400 kg/m$^3$, from 100 kg/m$^3$ to 300 kg/m$^3$, from 125 kg/m$^3$ to 300 kg/m$^3$, from 140 kg/m$^3$ to 300 kg/m$^3$, from 200 kg/m$^3$ to 300 kg/m$^3$, from 250 kg/m$^3$ to 400 kg/m$^3$, from 250 kg/m$^3$ to 350 kg/m$^3$, from 250 kg/m$^3$ to 300 kg/m$^3$, from 160 kg/m$^3$ to 250 kg/m$^3$, from 180 kg/m$^3$ to 225 kg/m$^3$, from 200 kg/m$^3$ to 225 kg/m$^3$, or from 230 kg/m$^3$. In some aspects, the thermoplastic elastomer foam has a foam density of from 50 kg/m$^3$ or from 75 kg/m$^3$ or from 100 kg/m$^3$ or from 125 kg/m$^3$ or from 130 kg/m$^3$ or from 140 kg/m$^3$ to 160 kg/m$^3$ or to 180 kg/m$^3$ or to 200 kg/m$^3$ or to 225 kg/m$^3$ or to 250 kg/m$^3$ or to 275 kg/m$^3$ or to 300 kg/m$^3$. In some aspects, the thermoplastic elastomer foam has a foam density of from 150 kg/m$^3$ or from 175 kg/m$^3$ or from 200 kg/m$^3$ to 225 kg/m$^3$ or to 250 kg/m$^3$ or to 275 kg/m$^3$ or to 300 kg/m$^3$.

In various aspects, the foam of the thermoplastic elastomer comprising a semi-crystalline polymer may be further molded or shaped. In one method, the foamed articles of the thermoplastic elastomer comprising a semi-crystalline polymer are beads, pellets, particles, or similar relatively small sizes, which will be generally referred to in the following discussion as "pellets." In one example, a mold is filled with the foamed pellets and the pellets are molded at an appropriate temperature into a shaped article. The shaped article may be of any dimensions. For example, the molded foamed elastomer may be sized as a cushion or cushioning element that can be included in an article of footwear, for example part of a footwear upper, such as a foam element in a collar or tongue, as an insole, as a midsole or a part of a midsole, or an outsole or a part of an outsole; foam padding in shin guards, shoulder pads, chest protectors, masks, helmets or other headgear, knee protectors, and other protective equipment; an element placed in an article of clothing between textile layers; in clothing, in protective gear such as helmets, chest protectors, and shoulder pads, or may be used for other known padding applications for protection or comfort, especially those for which weight of the padding is a concern; or in furniture or in seats, for example bicycle seats.

For example, the thermoplastic elastomer-semi-crystalline polymer foam may be or be used to make an article of clothing or footwear. In some aspects, this thermoplastic elastomer foam may serve as a cushioning element for an article of clothing or footwear. In some aspects, an article of protective equipment comprises the thermoplastic elastomer foam including the semi-crystalline polymer. In some aspects, the thermoplastic elastomer foam described herein may serve as a cushioning element for an article of protective equipment. In some aspects, the thermoplastic elastomer foam comprises a thermoplastic polyurethane elastomer and the semi-crystalline polymer comprises ethylene vinyl alcohol copolymer.

In one aspect, a foamed article, such as a midsole for footwear, is formed by placing the foamed pellets of thermoplastic elastomer comprising a semi-crystalline polymer in a compression mold in the shape of the article. The pellets are heated with microwave energy to a peak temperature slightly above the melting temperature of the elastomer, which may be of from 100° C. to 180° C., over a period of from 60 to 1500 seconds. Within up to 30 seconds after the peak temperature is reached, the molded pellets are then cooled to from 5° C. to 80° C. over a period of from 300 to 1500 seconds. In various aspects, the thermoplastic elastomer comprising a semi-crystalline polymer foam pellets may preferably be generally spherical or ellipsoidal. In the case of non-spherical pellets, for example ellipsoidal beads, the largest major diameter of a cross-section taken perpendicular to the major (longest) axis of the ellipsoid. The foam pellets may preferably have a diameter of from 0.5 mm to 1.5 cm. Ellipsoidal pellets may be from 2 mm to 20 mm in length and from 1 to 20 mm in diameter. Each individual pellet may be, for example, from 20 to 45 mg in weight. The foam pellets may have a density of from 100 to 300 Kg/m$^3$ and the molded article may have a density from 100 to 450 Kg/m$^3$.

The foam pellets may be coated with an adhesive, for example a urethane-based adhesive, before being placed in the mold. Suitable commercially available adhesives include W-104, W-105, W-01, W-01S and SW07 from Henkel. Other adhesives such as WA-1C and WP1-116K from Han Young Industry Company can also be used. In general, these adhesives may be sprayed onto the foamed pellets or otherwise coated onto the foamed pellets.

The adhesive-coated foam pellets may be heated with microwaves or steam to a peak temperature above the melting temperature of the adhesive, for example to a temperature up 150° C., for example to a temperature of from 70° C. to 150° C., over a period of from 300 to 1500 seconds. In general, a longer time may be used for heating a thicker part to mold the part. Thus, a thicker part may be brought to the peak molding temperature over a longer period of time compared to the time in which a thinner part is brought to the peak molding temperature. In various aspects, the mold is brought to the peak temperature over a period of from 60 to 1200 seconds or from 60 to 900 seconds. A given skin thickness may be achieved by selection of the maximum heating temperature within the temperature range. Skin thickness may be selected to alter cushioning and feel of a molded midsole as used in an article of footwear. The skin thickness on a bead may be from 2 to 25 micrometers. The skin thickness on a molded part may be at least 20 micrometers. In various aspects, the peak temperature is selected to produce a skin thickness of from 10 to 200 micrometers.

The mold may then be cooled to a temperature of from 5° C. to 80° C. over a period of from 300 to 1500 seconds. Cooling is typically carried out by moving the mold to the cold side of the compression molding press between two cold plates. In general, a longer time may be used for cooling a thicker part.

In other aspects, the foamed pellets are molded with a matrix material of an unfoamed thermoplastic elastomer, which may include a blowing agent so that it is foamed during the molding process.

The molded article may be used as an insert in a further molding process, such as in a thermoforming process.

The method and foamed articles are further illustrated in the following examples.

Examples

Samples were prepared comprising 0 wt %, 1 wt %, 3 wt %, and 5 wt %, based on total polymer weight, of ethylene vinyl alcohol copolymer (EVOH) in ELASTOLLAN® 1180A10 thermoplastic polyurethane elastomer (obtained from BASF Polyurethanes GmbH). The materials were mix-melted in a twin-screw extruder, pelletized, and then dried in air. The pellets of the samples were impregnated at 200 bar and 40° C. with supercritical carbon dioxide as a blowing agent and then the pressure was released to foam the pellets. The uptake of carbon dioxide was measured by weight gain. The uptake of carbon dioxide did not change significantly with an increase in EVOH concentration within the pellets of the mixed samples. The foam density increased at higher concentrations of EVOH within the mixed samples. This data is presented in Table 1.

TABLE 1

| Sample | $CO_2$ Uptake (wt %) | Density (g/cc) |
| --- | --- | --- |
| A. ELASTOLLAN ® 1180A10 | 8.9 | 0.23 |
| B. ELASTOLLAN ® 1180A10 + 1 wt % EVOH | 10 | 0.24 |
| C. ELASTOLLAN ® 1180A10 + 3 wt % EVOH | 9.4 | 0.26 |
| D. ELASTOLLAN ® 1180A10 + 5 wt % EVOH | 9.3 | 0.27 |

Cross-sections of the foamed pellets were examined using scanning electron microscopy (Phenom model from FEI Company) and are presented in FIGS. 1A-1D. FIG. 1A shows the cell structure of a foamed pellet prepared without the addition of EVOH. FIG. 1B shows the cell structure of a foamed pellet prepared 1 wt % of EVOH. FIG. 1C shows the cell structure of a foamed pellet prepared 3 wt % of EVOH. FIG. 1B shows the cell structure of a foamed pellet prepared 5 wt % of EVOH. The cross-section images of the foamed pellets reveal finer cell structure when EVOH is present.

The foregoing descriptions of particular aspects illustrate features of the invention, but the invention is not limited to any of the specific aspects that have been described. The features described for particular aspects are interchangeable and can be used together, even if not specifically shown or described. The same may also be varied in many ways. The invention broadly includes such variations and modifications.

What is claimed is:

1. A method of making a thermoplastic elastomer foam, comprising:
   providing a polymer mixture comprising a thermoplastic elastomer and from 0.1 wt % to 20 wt %, based on total polymer weight, of a semi-crystalline polymer forming polymeric crystalline domains in the thermoplastic elastomer;
   incorporating a gaseous or supercritical blowing agent into the polymer mixture under pressure; and
   releasing the pressure and foaming the polymer mixture to form the thermoplastic elastomer foam,
   wherein the polymer mixture is formed by combining a molten thermoplastic elastomer and from 0.1 wt % to 20 wt %, based on total polymer weight, of a molten semi-crystalline polymer, then cooling the combined polymers to below a temperature at which the semi-crystalline polymer forms polymeric crystalline domains, wherein during the foaming step the polymer mixture is immersed in a heated fluid that is at a temperature that is at least 80° C. higher than the glass transition temperature of the thermoplastic elastomer and less than the crystallization temperature of the polymeric crystalline domains.

2. The method according to any of claim 1, wherein the semi-crystalline polymer comprises a member selected from the group consisting of copolymers of ethylene and at least one vinyl co-monomer, polyamides, polyesters, and combinations thereof.

3. The method according to claim 2, wherein the semi-crystalline polymer comprises a member selected from the group consisting of nylon 11, nylon 12, and ethylene-vinyl alcohol copolymers.

4. The method according to claim 1, wherein the thermoplastic elastomer comprises a thermoplastic polyurethane elastomer.

5. The method according to claim 1, wherein the blowing agent comprises carbon dioxide in gaseous or supercritical state.

6. The method according to claim 1, wherein the thermoplastic elastomer foam has a density from 160 kg/m$^3$ to 300 kg/m$^3$.

7. The method according to claim 1, wherein the thermoplastic elastomer foam is a closed-cell foam wherein a majority of the cells are closed.

8. The method according to claim 1, wherein the method comprises a cooling step that comprises forming the polymer mixture into articles in a shape of a pellet, bead, particle, tape, ribbon, rope, film, strand, or fiber.

9. The method according to claim 8, wherein the mixture is formed in an extruder, then extruded and pelletized during the cooling step.

10. The method according to claim 8, wherein a plurality of the articles are molded together into a molded article.

11. The method according to claim 10, wherein the molded article is selected from the group consisting of articles of clothing, footwear, protective equipment, straps, and components thereof.

12. A method of making a thermoplastic elastomer foam, comprising:
    providing a thermoplastic elastomer composition comprising a molten thermoplastic elastomer and from 0.1 wt % to 20 wt %, based on total polymer weight, of a molten semi-crystalline polymer;
    incorporating a gaseous or supercritical blowing agent under pressure into the thermoplastic elastomer composition;
    cooling the thermoplastic elastomer composition to a temperature below the crystallization temperature of the semi-crystalline polymer to form polymeric crystalline domains; and
    releasing the pressure to foam the thermoplastic elastomer, wherein during the foaming step the polymer mixture is immersed in a heated fluid that is at a temperature that is at least 80 C higher than the glass transition temperature of the thermoplastic elastomer and less than the crystallization temperature of the polymeric crystalline domains.

13. The method according to claim 12, wherein the semi-crystalline polymer comprises a member selected from the group consisting of copolymers of ethylene with at least one vinyl monomer, polyamides, polyesters, and combinations thereof.

14. The method according to claim 12, wherein the semi-crystalline polymer is from 1 wt % to 5 wt % of the polymer composition based on total polymer weight.

15. The method according to claim 12, wherein the thermoplastic elastomer composition comprises a thermoplastic polyurethane elastomer.

16. The method according to claim 12, wherein the blowing agent comprises carbon dioxide in gaseous or supercritical state.

17. The method according to claim 12, wherein the thermoplastic elastomer foam has a density of from 160 kg/m$^3$ to 300 kg/m$^3$.

18. The method according to claim 12, wherein the thermoplastic elastomer foam is a closed-cell thermoplastic elastomer foam, wherein a majority of the cells are closed.

19. The method according to claim 12, wherein thermoplastic elastomer foam is an article in a shape of an pellet, bead, particle, tape, ribbon, rope, film, strand, or fiber.

20. The method according to claim 19, further comprising molding the article into a member of the group consisting of articles of clothing, footwear, protective equipment, straps, and components thereof.

* * * * *